United States Patent [19]

Spears, Sr. et al.

[11] Patent Number: 4,934,461
[45] Date of Patent: Jun. 19, 1990

[54] PEANUT DIGGER AND VINE INVERTER

[76] Inventors: Cecil J. Spears, Sr., 112 McFarland Rd., Enfield, N.C. 27823; Larry Spears, 107 Live Oak Pl., Roanoke Rapids, N.C. 27870; Cecil J. Spears, Jr., 1015 Huntington Dr., Laurinburg, N.C. 28352

[21] Appl. No.: 349,819

[22] Filed: May 10, 1989

[51] Int. Cl.$^5$ ............................................. A01D 29/00
[52] U.S. Cl. ............................:................ 171/58; 171/62; 171/DIG. 1; 172/557
[58] Field of Search ..................... 171/50, 55, 58, 62, 171/3; 172/44, 518, 557, 574, 604, 190

[56] References Cited

U.S. PATENT DOCUMENTS

| | | | |
|---|---|---|---|
| 486,325 | 11/1892 | Cleveland | 172/574 X |
| 1,345,315 | 6/1920 | Byrd | 171/DIG. 1 |
| 2,669,820 | 2/1954 | Falkner | 171/62 X |
| 2,722,794 | 11/1955 | McGee | 55/139 |
| 2,747,488 | 5/1956 | Norton | 172/574 X |
| 3,024,849 | 3/1962 | Gregory | 171/61 |
| 3,637,023 | 1/1972 | Wood | 171/1 |
| 3,770,064 | 11/1973 | Scarnato et al. | 171/58 |
| 3,792,733 | 2/1974 | Crandall et al. | 171/58 |
| 4,633,955 | 1/1987 | Gresham | 171/1 |
| 4,699,218 | 10/1987 | Schwitters | 171/58 X |
| 4,786,113 | 11/1988 | Vandenberg | 172/190 X |

OTHER PUBLICATIONS

"Peanut Digger-Shaker-Inverter", Sales Brochure, KMC, 10-3-89.
Lilliston 8100 Brochure—Lilliston Corporation, Albany, Georgia 1977.

Primary Examiner—Randolph A. Reese
Assistant Examiner—Jeffrey L. Thompson
Attorney, Agent, or Firm—Kerkam, Stowell, Kondracki & Clarke

[57] ABSTRACT

A peanut vine digging and vine inverting apparatus is disclosed consisting of a plurality of diggers in the form of modified discs; a tap root cutter for each row of diggers and means for positioning the vines on the ground with the peanuts upwardly to be sun dried.

7 Claims, 5 Drawing Sheets

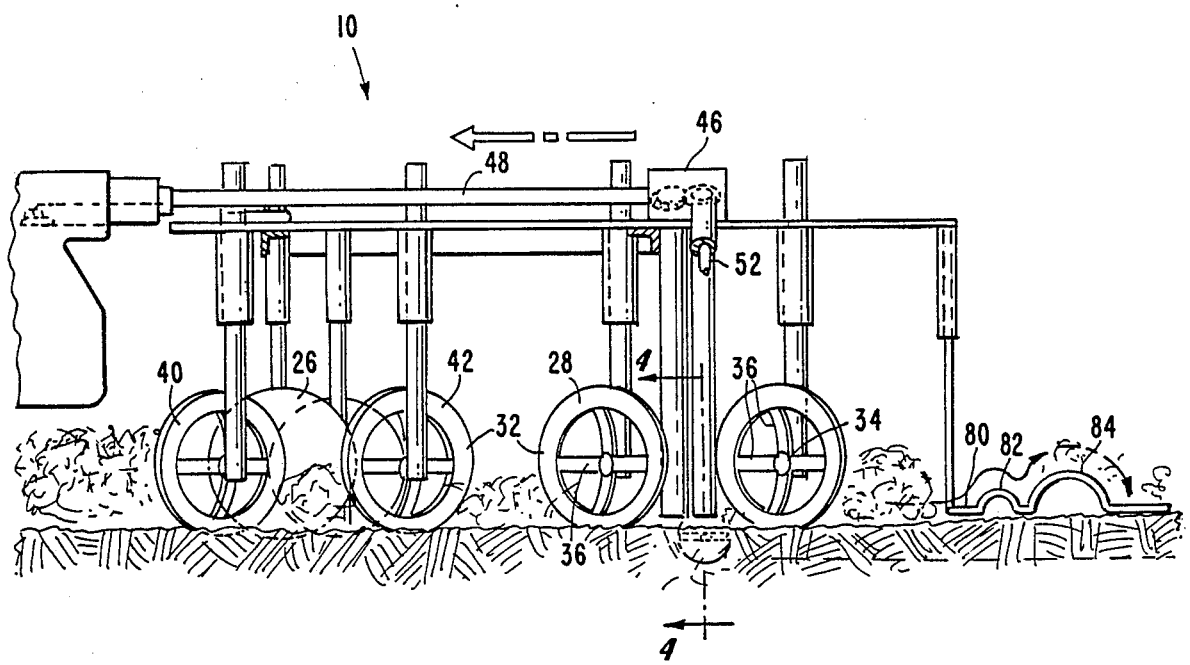
FIG. 3
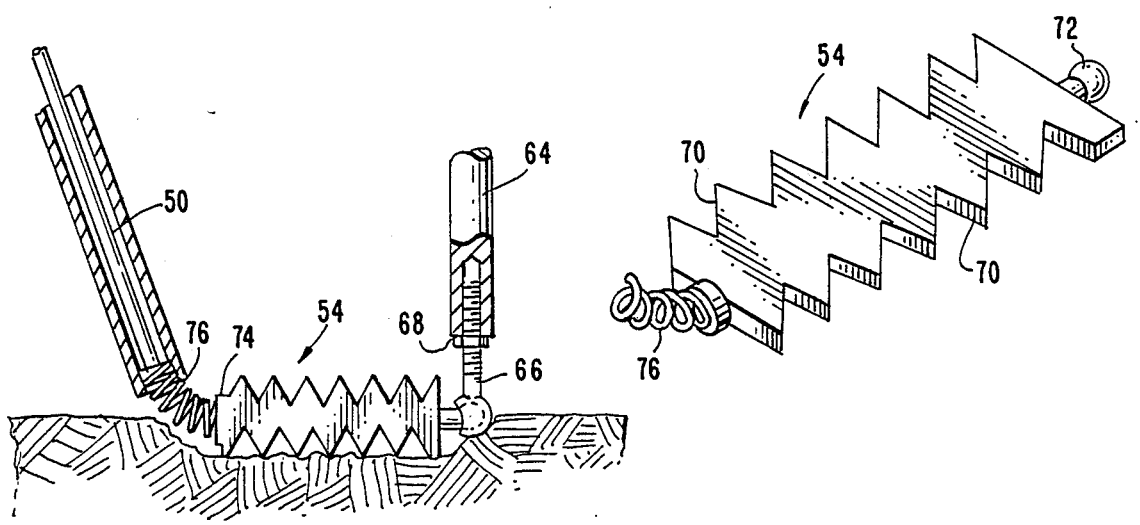
FIG. 4
FIG. 5

PEANUT DIGGER AND VINE INVERTER

BACKGROUND OF THE INVENTION

This invention relates to a peanut digging and vine inverting machine for rows of peanuts; which separates the vine and nuts from the soil and deposits the vine with the attached peanuts facing upwardly to be sun dried prior to harvesting.

Peanut digging machines and harvesters are basically known in the art and the following patents are examples of such prior art devices: McGee 2,722,794; Gregory, 3,024,849; Wood, 3,637,023; and Gresham et al, 4,633,955.

The latter patent, Gresham et al is an example of both a digging machine for peanuts and a harvester.

SUMMARY OF THE INVENTION

The peanut digging and vine inverting machine of the invention, comprises at least a pair of rows of opposing digging, rotatable disc like members positioned at an angle to the vertical axis of the drawing machine which disc like members have basically hollow central portions and peripheral rims. The disc like members lift the peanuts, their vines and the surrounding soil upwardly as the drawing vehicle proceeds in a forward direction and the heavier earth is caused to fall back into the furrow whereas the lighter vines are freely positioned upon the earth's surface where they are caused to be rotated positioning the peanut in an upward direction and the vines in a lower position or the peanuts with the vines downwardly are positioned on catcher rods and deposited on the ground. The assembly may also include for each harvesting row, a root cutter which may precede or succeed the device employed to rotate the harvested vine and peanuts. The unit may also include stabilizing discs which are rotatably mounted on outriggers which assist in maintaining the path of travel of the harvester to peanut rows.

BRIEF DESCRIPTION OF THE DRAWINGS

FIG. 3 is a side elevational view of the structures illustrated in FIG. 2;

FIG. 4 is a fragmentary detailed view of the root severing mechanism for each harvesting row;

FIG. 5 is an enlarged perspective view of the root cutting bar per se;

DETAILED DESCRIPTION OF THE INVENTION

Figure 1:
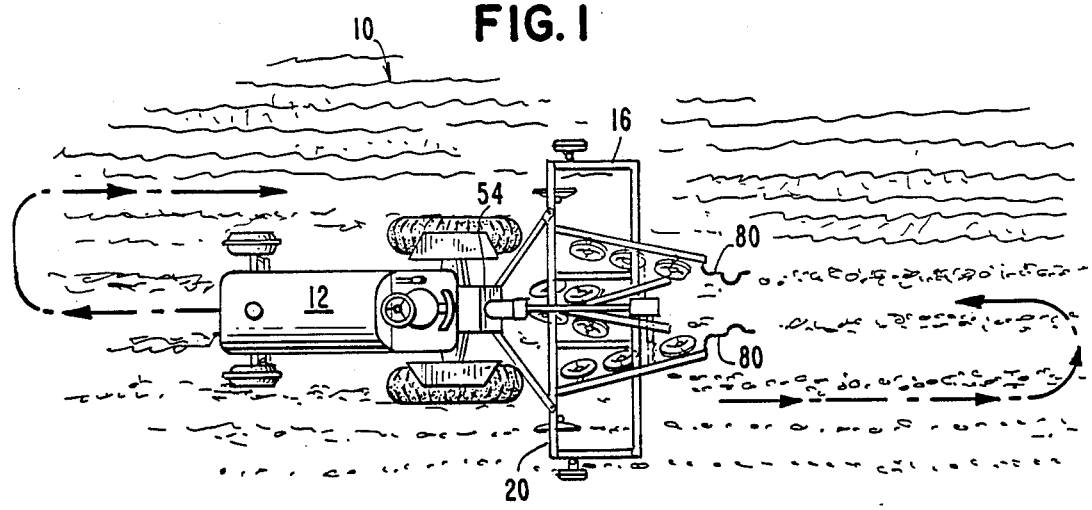
FIG. 1 diagrammatically illustrates a peanut digging and vine inverting machine having two harvesting rows attached to a frame pulled by a prime mover having at least one power takeoff.

Referring to the drawings 10 generally designates the peanut digger/inverter of the invention and its towing vehicle. In the illustrated form of the invention, the towing Vehicle comprises a tractor 12 having a power take-off mechanism 14. The peanut digger and inverter comprises a rectangular frame 16 having a pair of outrigger wheels 18 at each side element of the rectangular frame 16. The front beam 20 of the machine has connection to a pair of tow rods 22 which tow rods are connected to the towing hitches adjacent the power take-off mechanism 14 of the tractor.

Figure 2:
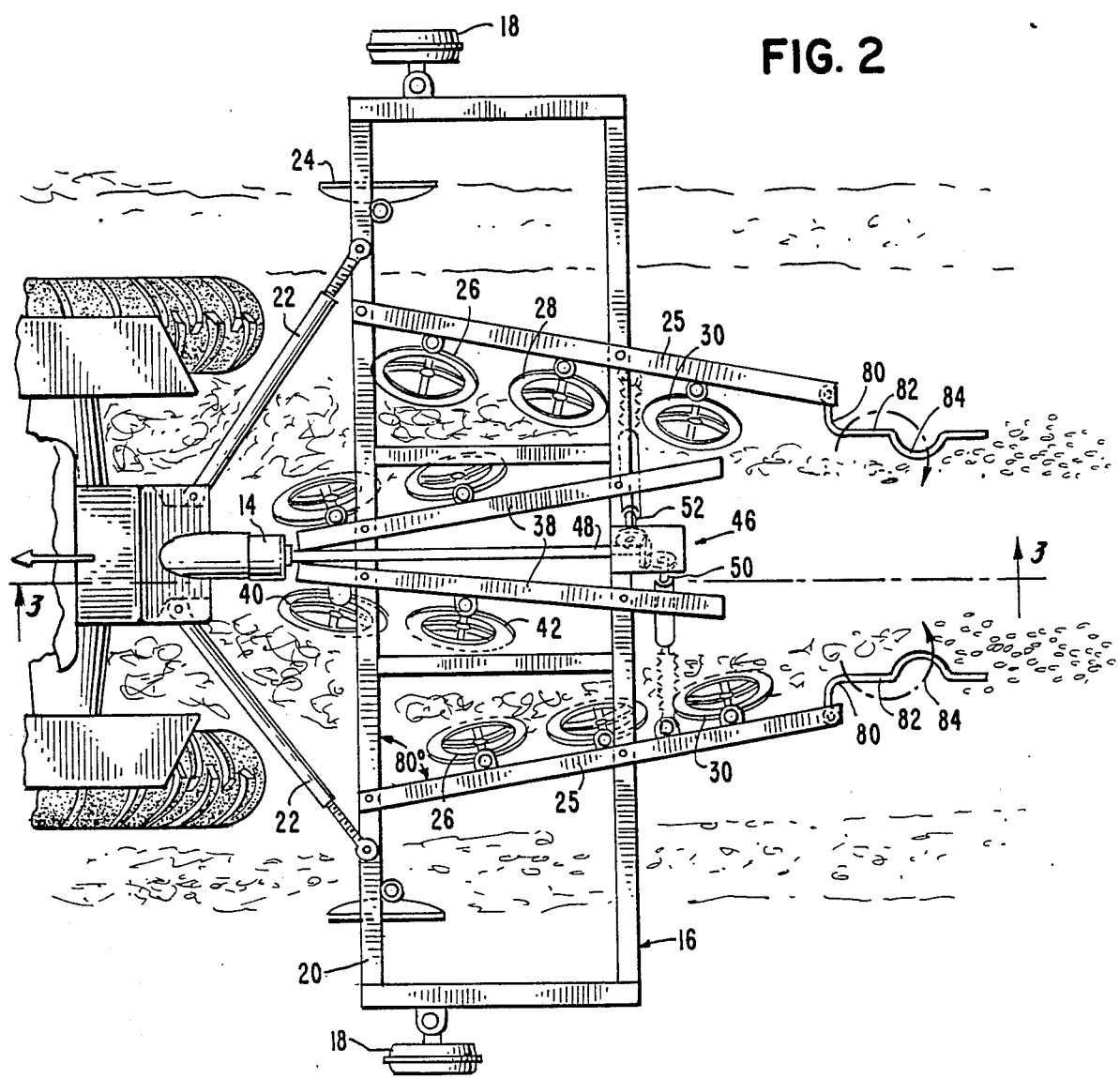
FIG. 2 an enlarged top view of a portion of the structures illustrated in FIG. 1.

The forward beam 20 of the rectangular frame 16 supports in spaced relation a pair of conventional stabilizing discs 24 which stabilizing discs assist in maintaining row tracking of the digger/inverter as each disc is adjusted to penetrate into the soil of the peanut field. The assembly also includes a pair of beams 25 which are connected, such as by bolts, to the forward and rearward frame members of the rectangular frame 16. It will be noted particularly from the top plan views that the beams slope inwardly from front to back with the beams attached at an angle of about 80° as illustrated in FIG. 2.

Figure 6:
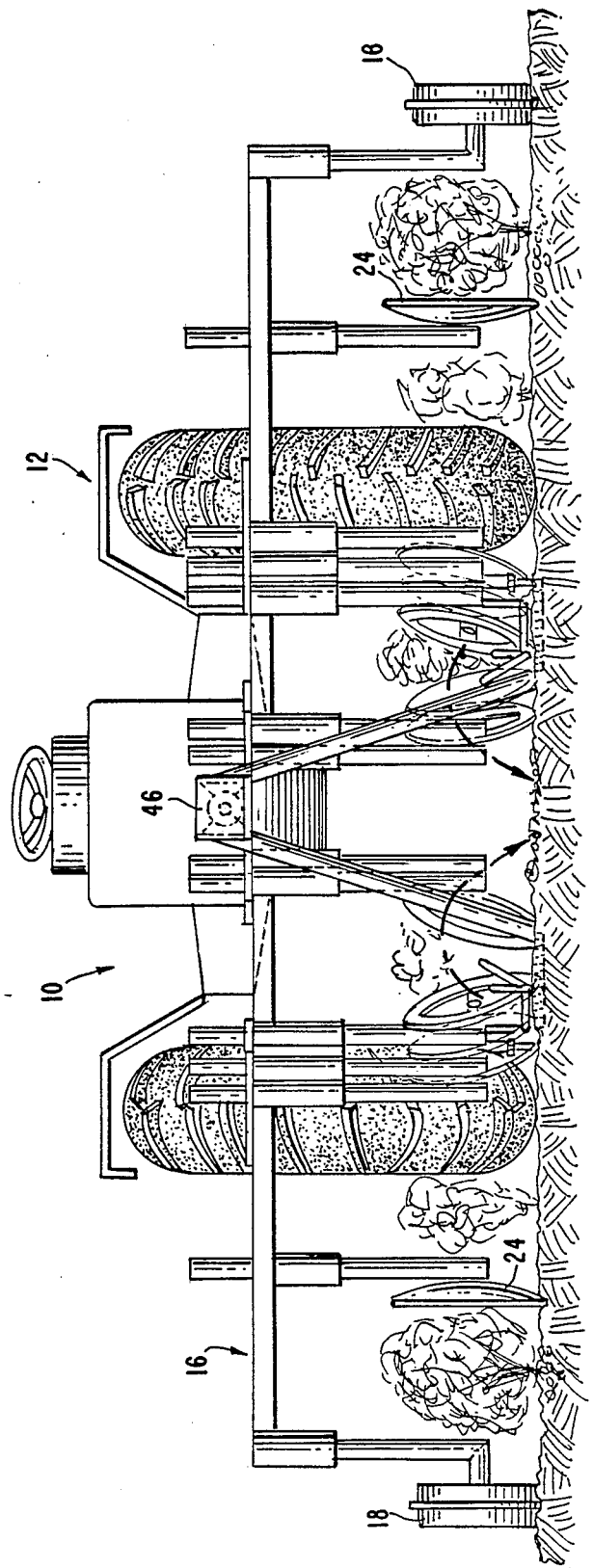
FIG. 6 is a rear view of the structures shown in FIGS. 1 and 2.
Figure 7:
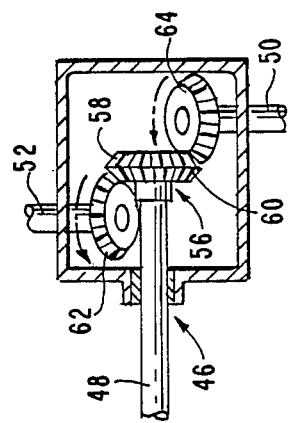
FIG. 7 is a schematic perspective view of the transmission for connecting the power take-off shaft to the pair of root cutting shafts.

Each of the beams 25 supports three novel digging discs 26, 28 and 30 with each of the novel discs 26, 28 and 30 mounted parallel to the horizontal axis of beams 25 and as shown in FIG. 6 each of the modified discs are mounted off vertical and sloped with their pivotable axis at an angle of for example, about 10° to 15° off vertical.

As more clearly shown in FIG. 3 each of the novel digging discs 26 through 30 comprises a dish like rim portion 32 connected to a hub 34 by spokes 36. In the illustrated form of the invention, four spokes are illustrated, however the device would function with two or three spokes as the spaces between the spokes permits the earth being upturned by the digging-discs to fall back to the surface of the ground through such spaces whereas the lighter vines and peanuts are lifted upwardly and fall to the surface of the ground.

To complete the digging aspect of the invention, the rectangular frame 16 has attached thereto a pair of bars 38 which bars are also connected at an angle opposite to the angle of placement of the beams 25 carrying the outer most digging discs. Each of the inner angular frame members 38 carries a pair of digging discs 40 and 42. The discs 40 and 42 are identical to discs 26, 28 and 30 and are mounted to their respective frame members 38 as basically mirror images of the mounting positions of discs 26, 28 and 30. In the illustrated and preferred embodiment each disc 42 is positioned substantial directly opposite its counter part discs 26 whereas the most forward discs 40 are mounted just forwardly of the leading edge of front frame member 20 of rectangular frame 16.

Between the pair of beams 38 rearward of the rearward beam of the rectangular frame 16 is mounted a transmission 46 which transmits power from the power take-off shaft 48 to a pair of depending shafts 50 and 52 which lead from the transmission 46 to a pair of root cutters 54 more clearly shown in FIGS. 4 and 5. Power from the power take-off mechanism 14 rotates shaft 48 as shown by the directional arrow. Suitable clutch means, etc. as is known in the tractor power take-off art are not shown. At the end of shaft 48 is a novel gear 56 having a pair of opposed bevel gear faces 58 and 60.

Bevel gear 58 meshes with bevel gear 62 keyed to shaft 50 while bevel gear 60 meshes with bevel gear 64 keyed to cutter shaft 52.

The power take-off gears are such as to rotate the shaft 48 in a direction such that shafts 50 and 52 rotate in the direction opposite the direction of movement of a vehicle in a forward direction.

Referring now, particularly to FIGS. 3 through 5, the peanut vine root cutter 54 for each row is supported from a fixed shaft 64 supported from the digger/inverter frame with the lower end of the shaft carrying a ball joint 66. The height of the lower end of the shaft is changeable by nut 68 and the threads on the shaft 66. The root cutter 54 in a preferred embodiment is about 4 inches long, one inch wide, and about ½ inch thick with serrations or such as zigzag teeth shown at 70. One end of the cutter has formed or attached thereto a ball 72 which rotates in the ball joint 66. The serrations are about ½ inch deep and ½ inch between the points thereof.

Between the lower end of shaft 50 and end 74 of the cutter 54 is a helical spring 76 which functions as a universal joint and at the same time, this spring permits cushioning of the cutter if large stones are encounter in its forward travel.

The entire cutter blade assembly 54 is adjusted to rotate about 1 inch below the surface and engages the roots of the peanut plant, severing them from the surrounding soil.

Rearward of the last of the modified disc diggers is a novel rod generally designated 80 having first a small hump 82 followed by a large hump 84 with the larger hump 84 leaning inward of the vertical of the rod 80. This rod having the two humps 82 and 84 finishes the inverting of the peanut vine to expose the peanuts to the sun. Each of the inverter rods is connected to the main rectangular frame of the digger via the cross frame members 25 as more clearly shown in FIG. 2 of the drawings.

The digger discs as hereinbefore described may be of several configurations however, it has been found that a disc having a diameter of about 20 inches is highly satisfactory. With a 20 inch diameter disc the rim portion 32 would be about 2½ to 3 inches.

DETAILED DESCRIPTION OF MODIFIED FORM OF THE INVENTION

Referring to the drawings FIGS. 8 through 11 (The modified digger/inverter) 10' generally designates the peanut digger/inverter of the invention and its towing vehicle. In the illustrated form of the invention, the towing vehicle comprises a tractor 12' having a power take-off mechanism as in FIGS. 1 and 2. The peanut digger and inverter comprises a rectangular frame 16' having a pair of outrigger wheels 18' at each side element of the rectangular frame 16'. The front beam 20' of the machine has connection to a pair of tow rods which are connected to the towing hitches adjacent the power take-off mechanism of the tractor.

The forward beam 20' of the rectangular frame 16' supports in spaced relation a pair of conventional stabilizing discs 24' which stabilizing discs assist in maintaining row tracking of the digger/inverter as each disc is adjusted to penetrated into the soil of the peanut field. The assembly also includes a pair of beams 25' which are connected, such as by bolts, to the forward and rearward frame members of the rectangular frame 16'. It will be noted particularly from the top plan views, FIG. 8, that the beams slope inwardly from front to back with the beams attached at an angle of about 80° as illustrated.

Figure 8:
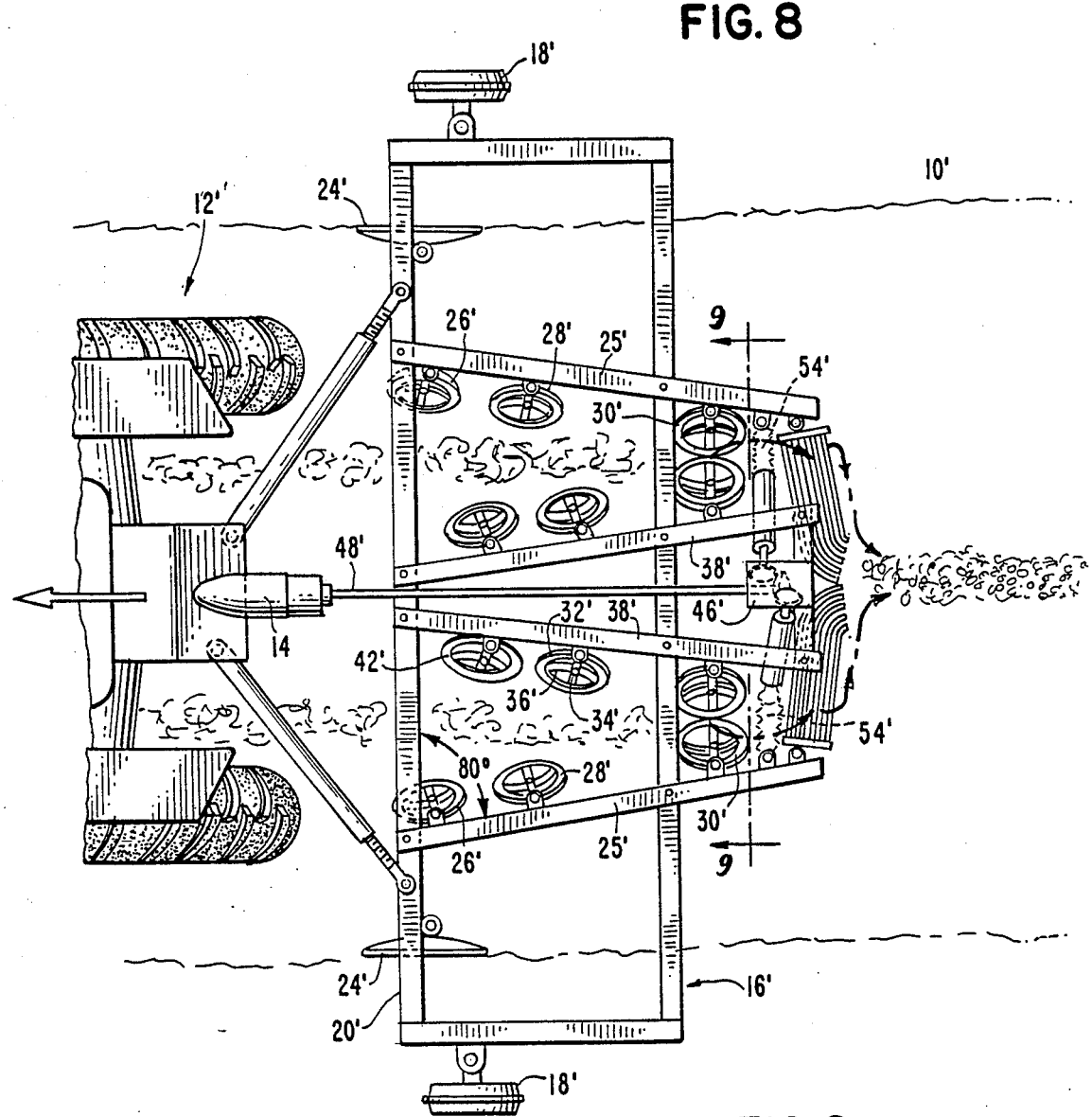
FIG. 8 is a top plan view like FIG. 2 of a modified form of the present invention.
Figure 9:
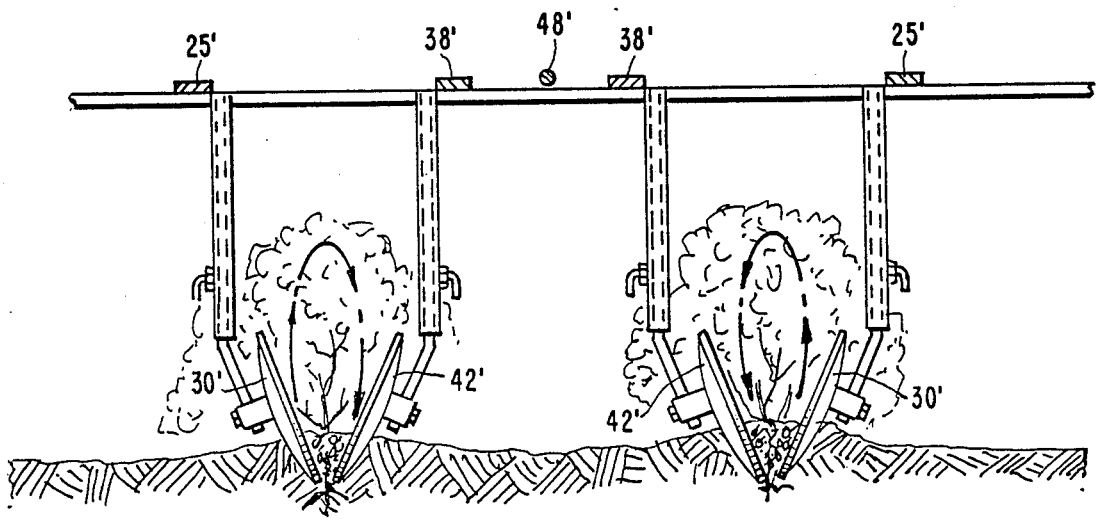
FIG. 9 is a rear view of the most rearward pair of discs illustrated in 8.
Figure 10:
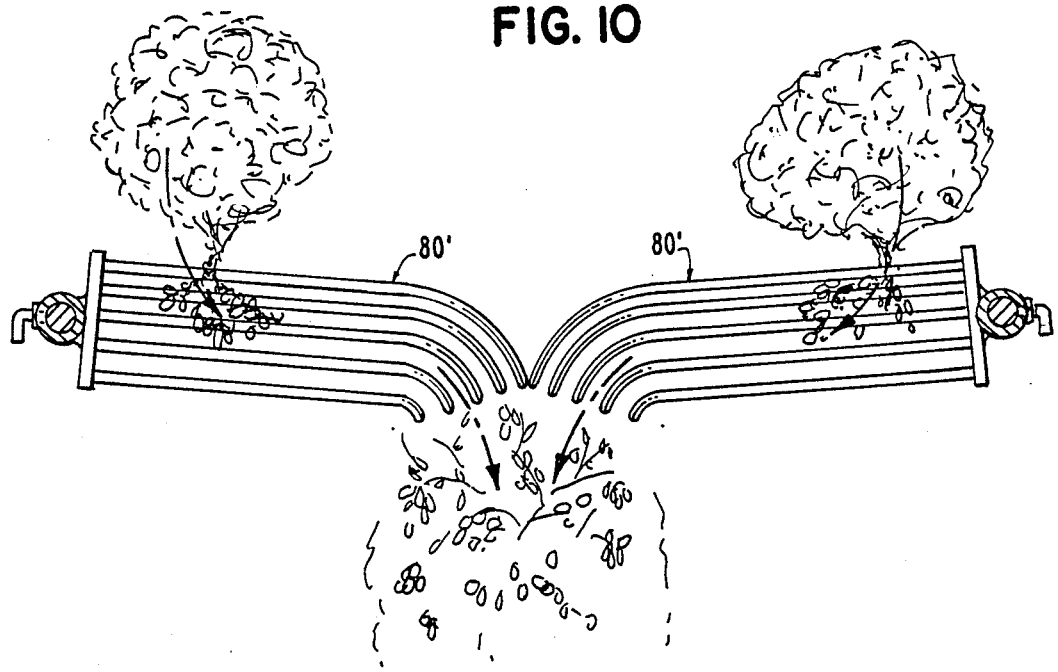
FIGS. 10 and 11 show top and side views of the catcher rods at the rearward end of the machine shown in FIGS. 8 and 9.
Figure 11:
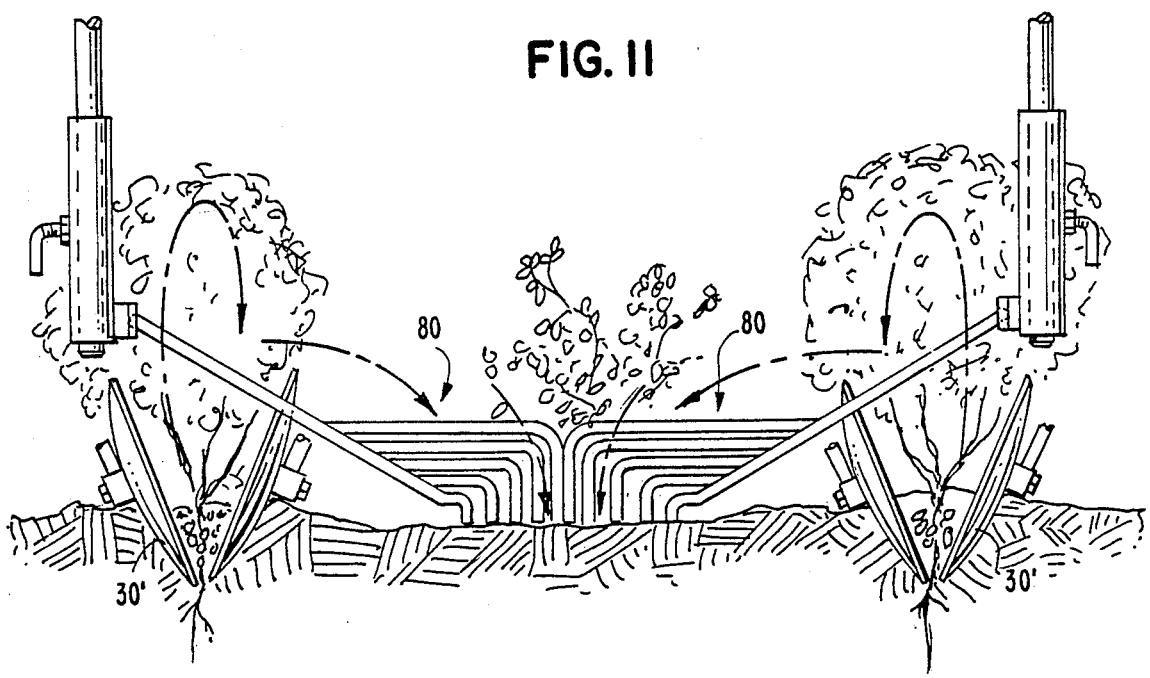

Each of the beams 25' supports two novel digging discs 26', and 28' and a third lifting and inverting disc 30' with each of the novel discs 26', 28' and 30' mounted parallel to the horizontal axis of beams 25' and as shown in FIG. 8 each of the modified discs are mounted off vertical and sloped with their pivotable axis at an angle of for example, about 10° to 15° off vertical for discs 26' and 28' where as discs 30' are sloped at a greater angle such that they are touching at the bottoms thereof. Angles of about 10° to 15° off vertical are satisfying.

As more clearly shown in FIG. 3 of the prior form of the invention each of the novel discs 26' through 30' comprises a dish like rim portion 32' connected to a hub 34' by spokes 36'. In the illustrated form of the invention, four spokes are shown, however the device would function with two or three spokes as the spaces between the spokes permits the earth being upturned by the digging discs to fall back to the surface of the ground through such spaces whereas the lighter vines and peanuts are lifted upwardly and fall to the surface of the ground or on the rods as to be described in reference to FIGS. 10 and 11. To complete the digging aspect of the invention, the rectangular frame 16' has attached thereto a pair of bars 38' which bars are also connected at an angle opposite to the angle of placement of the beams 25' carrying the outer most digging discs. Each pair of the inner angular frame members 38' carries 3 discs 42'. The discs 42' are identical to discs 26', 28' and 30' and are mounted to their respective frame members 38, as basically mirror images of the mounting positions of discs 26', 28' and 30' and across from discs 26', 28' and 30'.

Between the pair of beams 38' rearward of the rearward beam of the rectangular frame 16' is mounted a transmission 46' which transmits power from the power take-off shaft 48' to a pair of depending shafts which lead from the transmission 46, to a pair of root cutters 54' more clearly shown in the prior forms of the invention, FIGS. 4 and 5.

The root cutters 54, are driven and function in a manner identical to the root cutter shown and described in the prior form of the invention.

In the prior form of the invention, the peanuts with their vines are engaged by rearwardly trailing rods 80, one for each row, which rods are provided with humps which cause the vines severed by the cutters 54 to be inverted with the vine downwardly and the peanuts upwardly and then deposited as the digger/inverter continues to move forwardly.

In this form of the invention, the last opposed pair of discs 30' through 42' lift the vines with the attached peanuts upwardly and rearwardly to deposit the vines and peanuts in an inverted position upon a series of rods 80'. In the illustrated form of the invention there are for example, five longitudinal rods which are secured to frame or rod members 25' and direct the inverted vine/peanut plants inwardly between the pair of row harvester to deposit the plants, in a peanut upwardly direction, upon the ground. To assist in such transfer, the lower most unattached ends of the rods are curved sharply downwardly and rearwardly as more clearly shown in FIG. 10 and 11 of the drawings. In a preferred configuration of this form of the invention there are about five rods spaced about two inches apart. Further the last five inches of the rods are the portions which are curved sharply and backwardly.

From the foregoing description, it will be appreciated by those skilled in the art that a very practical relatively inexpensive and highly efficient peanut vine digging and vine inverting machine has been provided. It will also be appreciated by those skilled in the art that various modifications may be made in the exact configuration of the various components of the machine and their sizes without departing from the scope of the present invention.

We claim:

1. A peanut digging and vine inverting machine comprising at least a pair of rows of digging rotatable disc-like members positioned at an angle to a vertical axis to a drawing machine;

said disc-like members having hollow central portions and peripheral rims, which disc-like members lift the peanuts, their vines and the surrounding soil upwardly as the drawing vehicle proceeds in a forward direction, and the heavier earth is caused to fall back into the furrow whereas the lighter vines are freely positioned on the surface of the earth in an inverted position;

including for each pair of rows a vine inverting means, further including stabilizing discs which are rotatably mounted on outriggers which assist in maintaining the path of travel of the machine to peanut rows;

wherein the disc-like members have at least a pair of spokes connecting the peripheral rims to a hub, further wherein the diameter of the disc-like members is about 20 inches;

wherein means carried by the machine for cutting roots of the vines comprises rotating knives and wherein the rotating knives are driven through transmission means connected to a tractor power take-off;

further wherein the knives for cutting the roots of the vines are rotated in a direction opposite to the direction of movement of the peanut digging and vine inverting machine; further wherein there are at least five disc-like digging members for each pair of rows; and wherein three of the disc-like members form a first row and oppose two of the disc-like members which from a second row.

2. The invention defined in claim 1 wherein the opposed rows of disc-like members are positioned such that they converge closer together from front to rear of the harvesting machine.

3. The invention defined in claim 1 wherein the vine inverted means comprises for each pair of rows a rod lying close to the ground with a pair of spaced humps, with the first of said humps being smaller than the second hump and said second hump being angled toward the center line of the peanut row being harvested.

4. The invention defined in claim 3 wherein the vine inverting rod is mounted rearward of the last of the digging disc-like members.

5. The invention defined in claim 3 wherein each vine root cutting means comprises a flat plate having zigzag leading and trailing edges and the plate is rotated about an axis normal to the direction of travel of the digging and inverting machine.

6. The invention defined in claim 1, wherein there are size disc-like digging members for each pair of rows; and wherein the disc-like members are positioned in two rows which converge from front to rear of the machine with three of the disc-like members positioned in a first row opposite to a second row of the other three disc-like members.

7. The invention defined in claim 1, wherein the last of the pair of disc-like members are in engagement at their lower-most position and comprise the vine inverting means.

* * * * *